US009047651B2

(12) United States Patent
Roumeliotis et al.

(10) Patent No.: US 9,047,651 B2
(45) Date of Patent: Jun. 2, 2015

(54) CONTACT MANAGEMENT SYSTEM

(75) Inventors: Tasos Roumeliotis, Orinda, CA (US); Joel Grossman, San Francisco, CA (US); David Hora, San Francisco, CA (US); Brian Martin, Moraga, CA (US); Daniel Hodges, San Francisco, CA (US)

(73) Assignee: Location Labs, Inc., Emeryville, CA (US)

( * ) Notice: Subject to any disclaimer, the term of this patent is extended or adjusted under 35 U.S.C. 154(b) by 321 days.

(21) Appl. No.: 13/620,397

(22) Filed: Sep. 14, 2012

(65) Prior Publication Data

US 2014/0082509 A1 Mar. 20, 2014

(51) Int. Cl.
*G06F 3/00* (2006.01)
*G06Q 50/32* (2012.01)

(52) U.S. Cl.
CPC .................................. *G06Q 50/32* (2013.01)

(58) Field of Classification Search
USPC ............................................ 715/739, 764
See application file for complete search history.

(56) References Cited

U.S. PATENT DOCUMENTS 8,145,417 B1 * 3/2012 Chitre et al. .................. 701/400
8,402,533 B2 * 3/2013 LeBeau et al. .................. 726/17
8,458,615 B2 * 6/2013 Chaudhri ...................... 715/803
8,487,885 B2 * 7/2013 Relyea et al. ................ 345/173
8,639,229 B2 * 1/2014 Apfel et al. .................. 455/416
8,738,688 B2 5/2014 Myers et al.
8,798,609 B2 * 8/2014 Jeon et al. .................... 455/418
2008/0246605 A1 10/2008 Pfeffer et al.
2009/0030998 A1 * 1/2009 Blagsvedt et al. ............ 709/206
2010/0011304 A1 * 1/2010 van Os ......................... 715/762
2012/0191497 A1 * 7/2012 Patterson et al. ............ 705/7.13
2012/0198013 A1 * 8/2012 Quillen et al. ................ 709/206
2013/0040629 A1 2/2013 Sprigg et al.
2013/0080954 A1 * 3/2013 Carlhian et al. .............. 715/769
2013/0111371 A1 * 5/2013 Reeves et al. ................ 715/761
2013/0143512 A1 6/2013 Hernandez et al.
2014/0082509 A1 * 3/2014 Roumeliotis et al. ......... 715/739
2014/0157138 A1 * 6/2014 Kuscher et al. ............... 715/739

* cited by examiner

*Primary Examiner* — David Phantana Angkool
(74) *Attorney, Agent, or Firm* — Dovas Law P.C.

(57) ABSTRACT

A family-plan management system integrating family plan widgets on mobile devices that interact with an API maintained and used by a central server is described. The family-plan management system enables high-visibility, low-effort communications between family-plan members as well as easy access to family-plan services offered by the central server. The API automatically identifies family plan members by accessing a database and then implements high-value web and mobile add-on services for the family plan members. The family-plan management system enables control and use of the family plan by the family plan member and enables the carrier to upgrade family plan services without direct action on the part of family plan members.

29 Claims, 9 Drawing Sheets

CONTACT MANAGEMENT SYSTEM

FIELD OF INVENTION

This application relates to services provided by mobile device network operations.

BACKGROUND

Personal mobile devices such as personal computers, tablets, and smart phones have gained widespread use over a relatively short period of time. Such devices are so common that they are approaching commodity status. Their widespread use and their breathtaking performance have resulted in major changes in the way we look at and use communications.

Most mobile devices rely on a major network operator ("carrier") to provide basic communications, texting, and support for wireless data and internet access.

The majority of carrier subscribers participate in what are known as "family plans"-families or groups of individuals that enter into a joint billing contract with a carrier. Because of the joint billing contract, simply being in a family plan tends to be indicative of a family relationship or the existence of an otherwise close and trusting relationship.

One reason for the widespread use of personal mobile devices is parents obtaining such devices for their children to use. While parents may purchase personal mobile devices for their children for many different reasons one very common reason is to implement a communication "lifeline"—an always available and always open channel that provides direct communications between family members, particularly between the parent and child. The availability of such lifelines has motivated parents to obtain personal mobile devices for children of younger and younger ages.

Family plans generally have two main types of users that are referred to herein as "parent" class users and "child" class users: A parent is a primary account holder who has authorized others to access and use the services of a family plan offered by a carrier. A child is any user whose mobile device has been authorized by the parent to access and use the services of the family plan offered by the carrier. In practice the parent gets billed for the cost of the family plan while the children get "free" access to the family plan. Generally the parent is also authorized to use the carrier's family plan. A family-plan management system that provides for and implements family-plan services would be beneficial.

Whether part of a family plan or not, modern high performance mobile devices support a variety of different types of software applications, specifically including "widgets". A widget is a software application having a graphical user interface icon that can be placed on the top-level interface of the mobile device, with that top-level sometimes being referred to as a "desktop home screen." Lower level visual interfaces are also provided on desktops. A widget provides an interactive and usually customizable presence on the mobile device desktop home screen. By simply using a widget a user can initiate a programmed action or view pertinent information without leaving the desktop home screen. Additionally, by placing the widget on the desktop home screen at mobile device start-up the widget can be used without subsequent initializing and/or loading.

There are thousands and thousands of widgets currently available. But, there is a very limited amount of space on a mobile device desktop home screen. Thus the number of widgets that can be run from the desktop home screen using graphical image interfaces is limited and the competition for the limited mobile device desktop home screen space is intense. Only the most useful widgets are loaded onto the desktop home screen at mobile device start up.

To maximize the number of graphical icons and to provide more visually pleasing desktop home screen widget graphical interfaces can be arranged in tiles. Widget graphical interfaces can either be placed manually by users or automatically arranged on the desktop home screen.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

High-visibility, low-effort communications between family plan members as well as easy access to family plan services offered by a carrier are enabled. A carrier implements a family-plan management system comprising an application program interface ("API") that enables automatic identification of members of a family plan based on mobile device numbers and internal carrier databases, and the carrier implements high-value web and mobile add-on services for the family plan members.

Beneficially, identifying a mobile device user who is part of a family-plan is performed by first identifying the mobile device user using the mobile device number and then cross-referencing that mobile device user using a carrier database to identify family plan members. This avoids having to obtain financial information from the individual mobile device users while allowing automatic activation of family-plan add-on services.

The family-plan management system further provides each family-plan mobile device user with a family plan widget that automatically implements a desktop graphical user interface that enables easy communication access to other family-plan members and easy access to other services provided by the carrier to family-plan members. The family-plan management system enables a carrier to add new family plan services and members without having to directly authorize or notify the individual family plan members that are eligible for new services.

A family plan widget may enable a range of family plan services using graphical user interfaces. Some family plan services may require the availability of one or more supporting applications. A family plan widget may detect if a required supporting application is installed, and if not installed or if the family plan service being requested is not subscribed too, the family plan widget may provide the user with an opportunity to obtain the required supporting application or implement the desired service.

A computer implemented method including the steps of generating within a graphical user interface a contact representation that corresponds to a particular contact is provided. A communication action representation, a location action representation, and a control action representation corresponding to the particular contact are generated responsive to a user actuation of the contact representation. Instructions are transmitted for controlling a mobile device corresponding to the particular contact based on the user actuation of the control representation.

The computer implemented method may further include transmitting instructions for locating the mobile device corresponding to the particular contact responsive to a user actuation of the location action representation. The contact representation may further include at least one icon of the particular user and the name of the particular user. The instructions for controlling the mobile device can include instructions that restrict access to at least one functional component of the mobile device. The instructions for controlling the mobile device can include instructions can restrict use of at least one communication functionality and electronic messaging functionality.

The computer implemented method can further include receiving location information and/or use information of the mobile device and then providing a notification that corresponds to the location information and/or the use information. The computer implemented method can include receiving at least one of location information and use information that correspond to the mobile device and providing a notification on the graphical user interface. The graphical user interface can include a plurality of contact representations that respectively correspond to a plurality of contacts. The graphical user interface can include a communication action representation, a location action representation, and a control action representation that correspond to a particular one of the plurality of contacts responsive to a user actuation of the contact representation, and instructions can be transmitted for controlling a mobile device that correspond to the particular user responsive to a user actuation of the control representation.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

Figure 6:
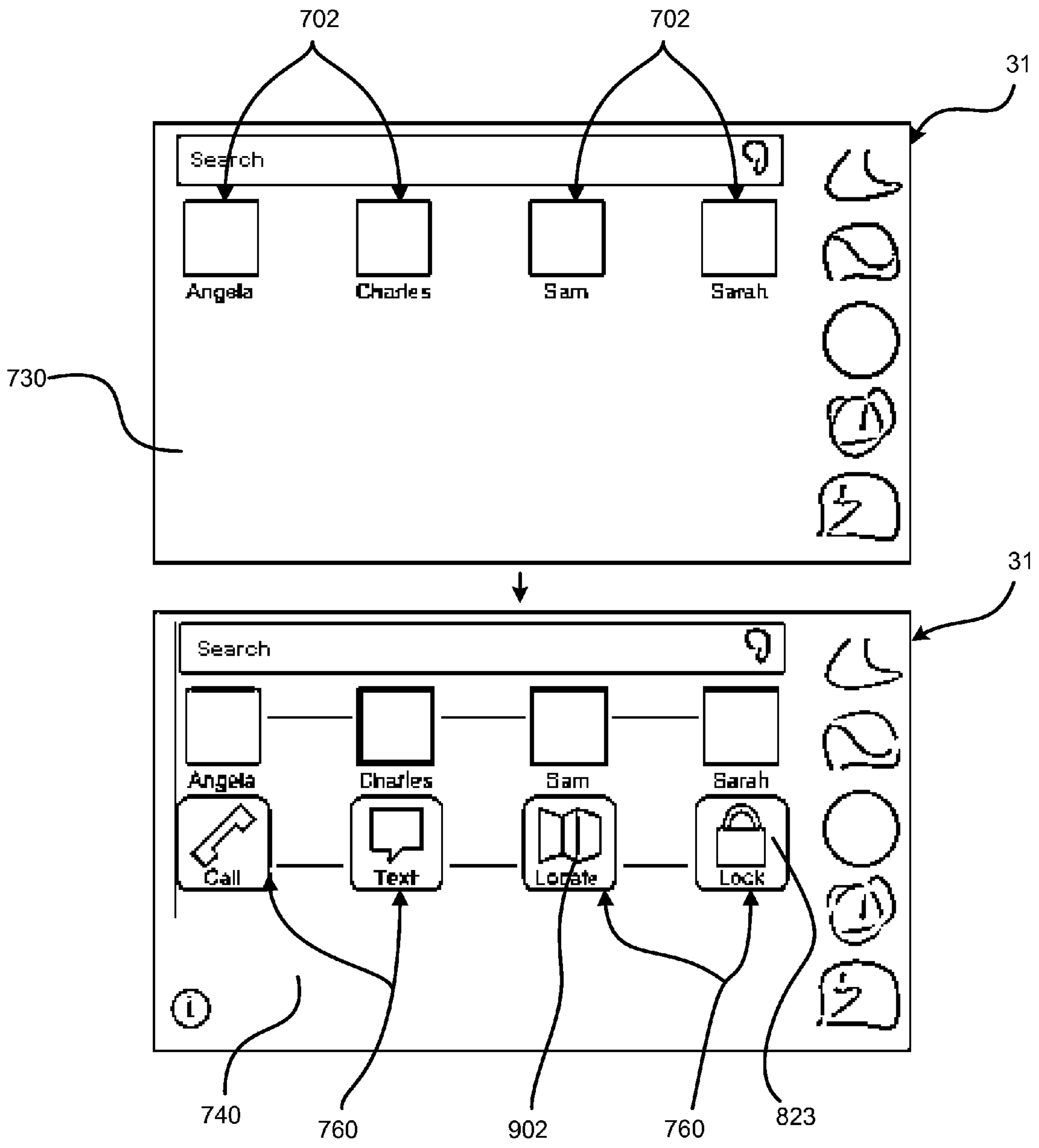
Figure 7:
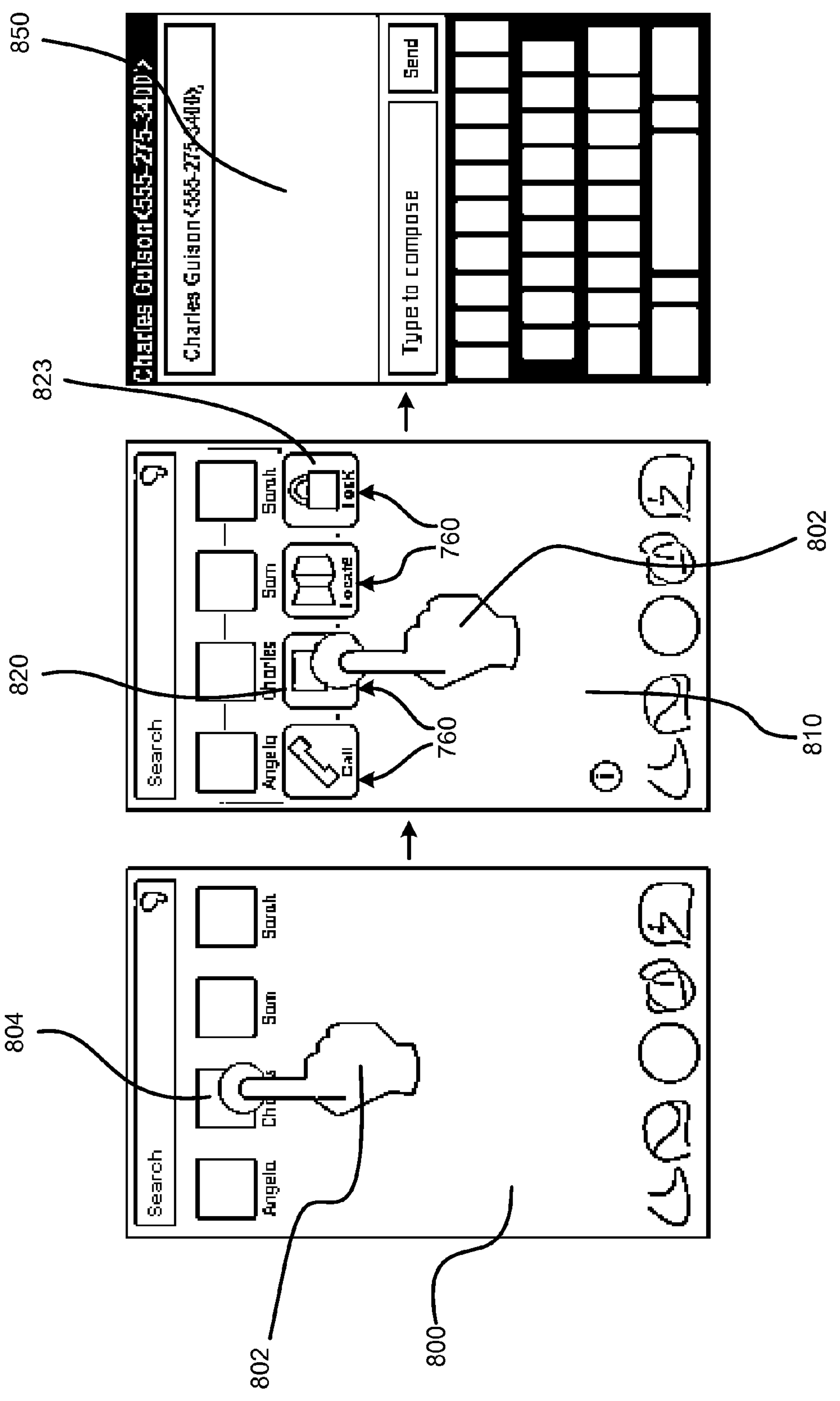
Figure 8:
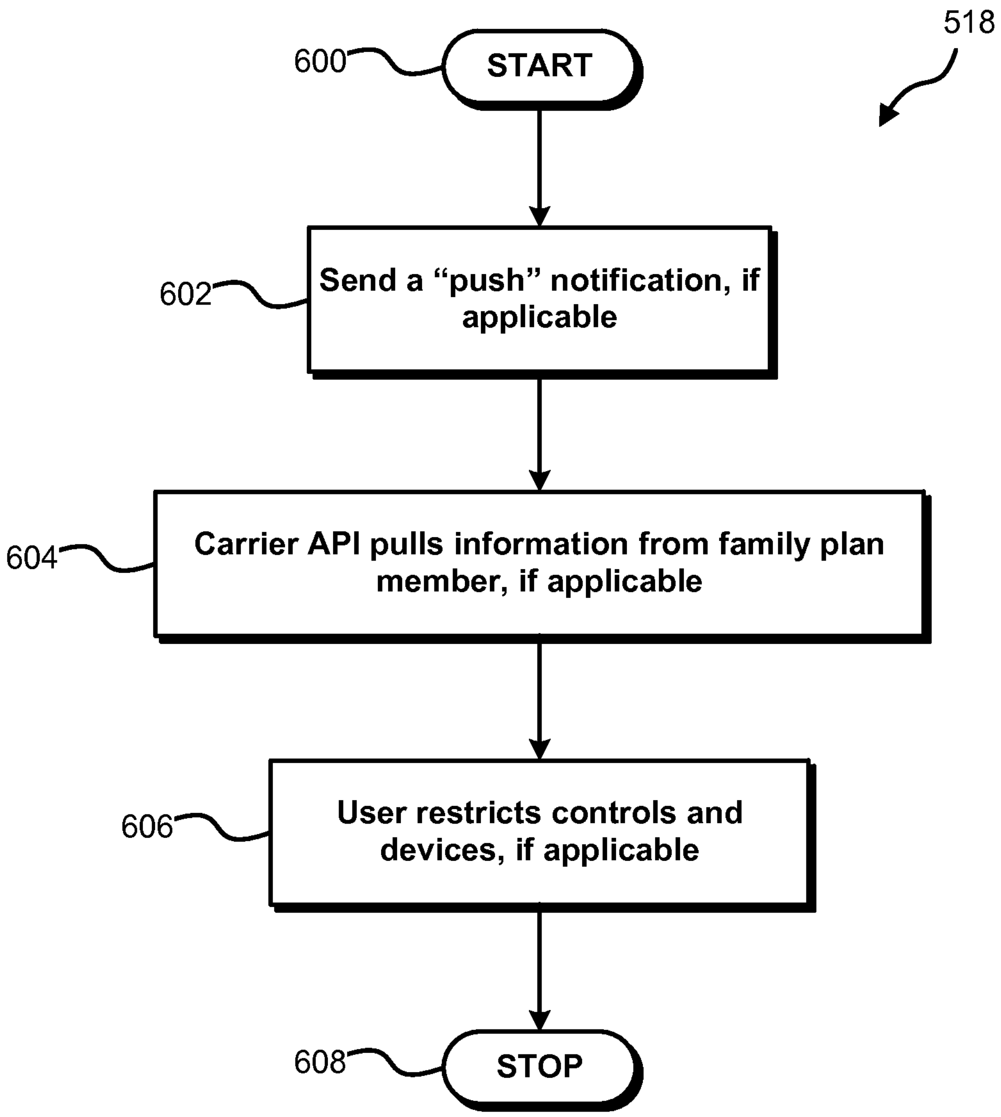

FIG. 6 presents prototypical examples of desktop displays during the operation of the family plan widget;

FIG. 7 presents additional prototypical examples of desktop displays during the operation of the family plan widget; and FIG. 8 is a flow chart showing a step of an operation of a family plan management system.

DETAILED DESCRIPTION OF ILLUSTRATIVE EMBODIMENT(S)

In the figures like numbers refer to like elements. Furthermore, the terms "a" and "an" as used herein do not denote a limitation of quantity, but rather denote the presence of at least one of the referenced items.

Figure 1:
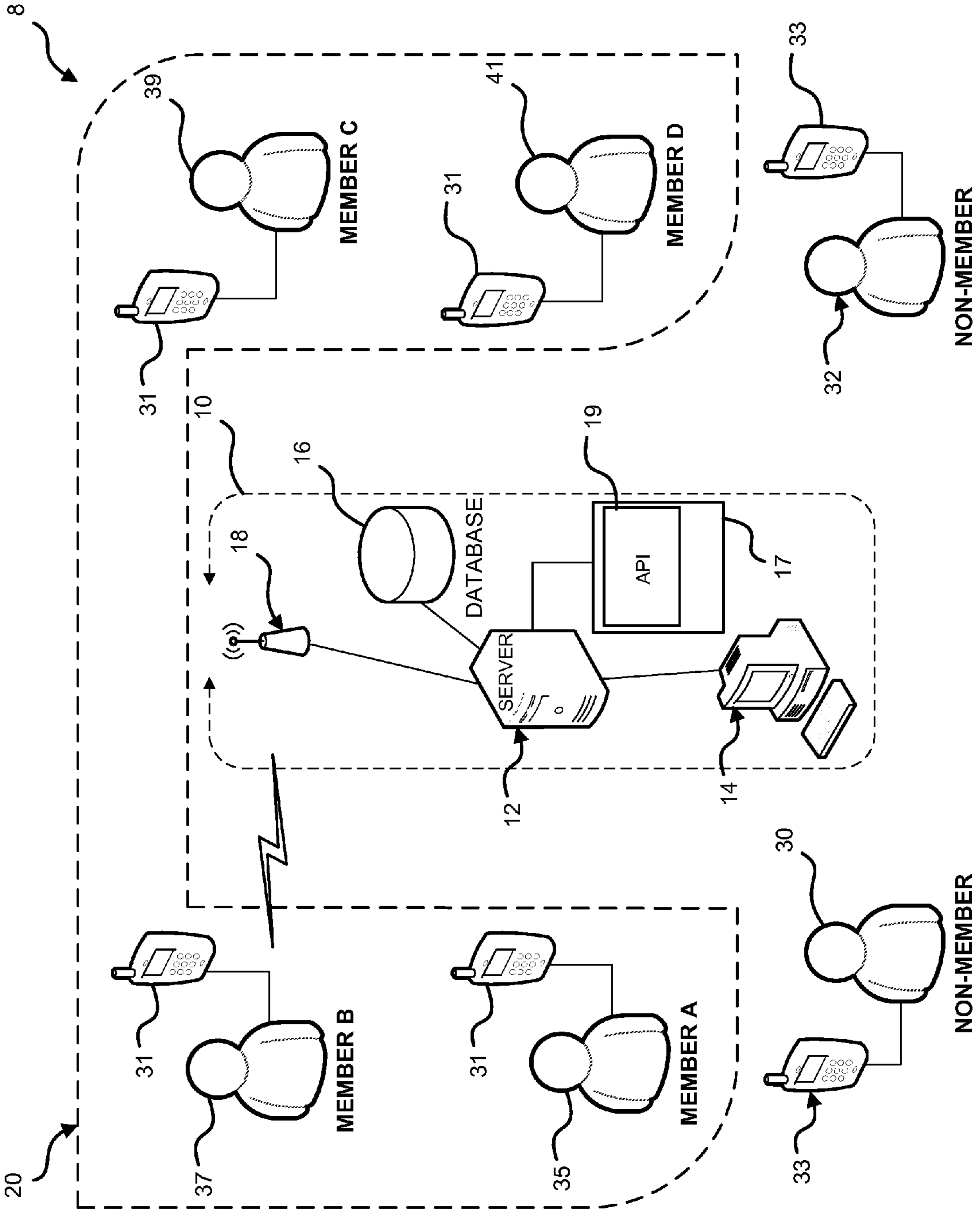
FIG. 1 is a depiction of a prototypical context in which one or more disclosed embodiments may be implemented.
Figure 2:
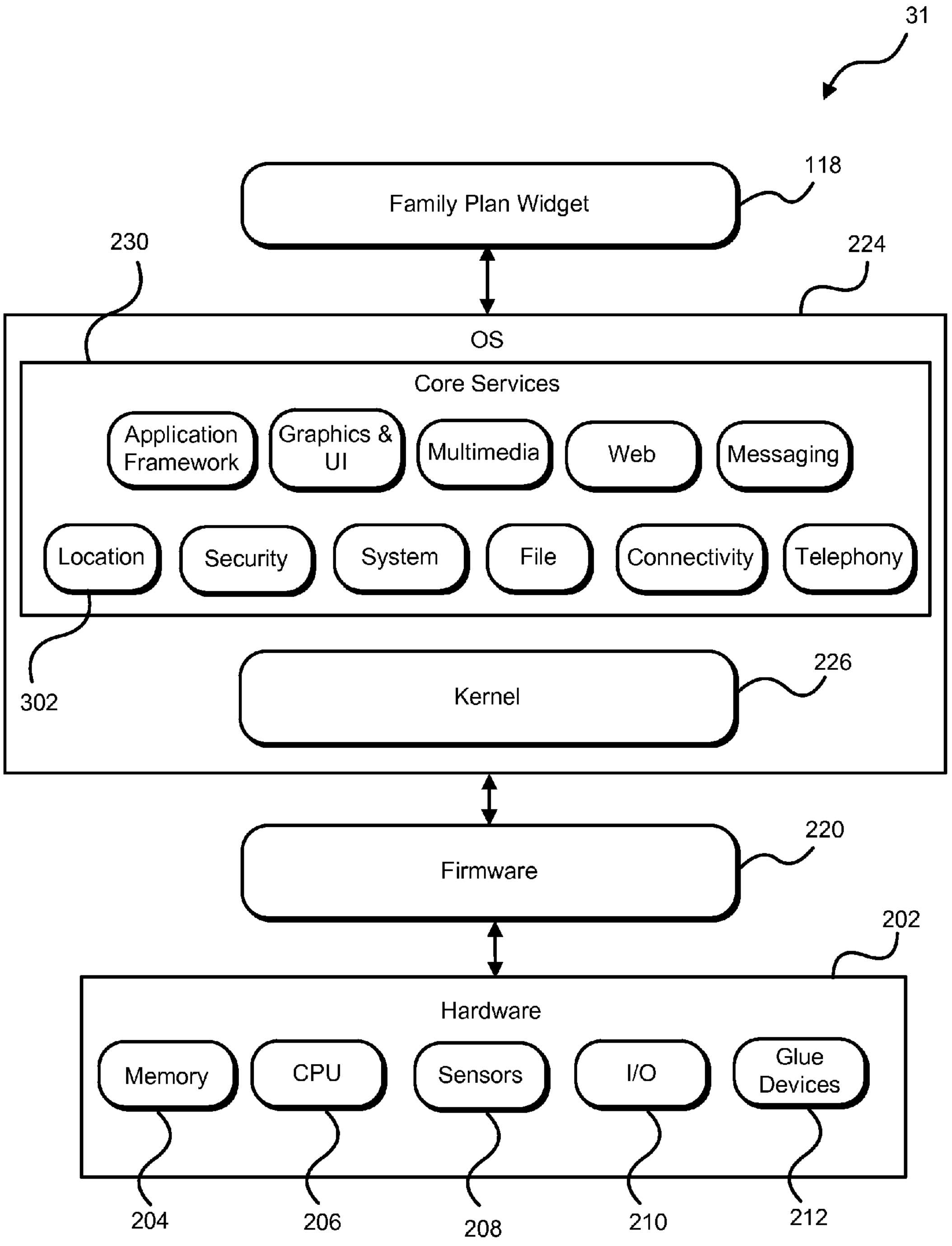
FIG. 2 is a block diagram depiction of a mobile device suitable for use with a family plan management system.

Referring to FIGS. 1 and 2, a family plan management system 8 is shown supported by an application programming interface ("API") 19 and mobile device family plan widgets 118 that implement graphical user interface icons used for obtaining family plan services. As used herein the term "family plan" can be used to denote any organized grouping of computer users, which users may be described generically as co-members of the plan. Typical mobile devices include smartphones, tablet computers, laptop computers, and other devices that support graphical user interface icons and wireless communications.

FIG. 1 shows a prototypical operating environment for the family plan management system 8. As shown, a telecommunication carrier-based central server 10 includes a server 12 with access to a carrier database 16 and an operator computer 14. The carrier database 16 specifically includes among other things carrier billing information. The central server 10 implements wireless communications 18, which should be understood as including a network of cellular towers, internet links, phone lines, microwave towers, and other communication facilities. The central server 10 runs in accord with internal software 17, which includes an API 19, for example a software API, preferably enabled by the telecommunication carrier.

The central server 10 provides data, voice, picture and other services to members of a family plan 20, shown in FIG. 1 as member A 35, member B 37, member C 39, and member D 41. In addition there are other users who are not part of the family plan 20. Those other users are generically represented by users 30 and 32. Each family plan 20 member has a mobile device 31. The users 30 and 32 have mobile devices 33. The functional difference between the mobile device 31 and the mobile device 33 is that the mobile devices 31 run family plan widgets 118.

The family plan management system 8 implements capabilities that expand the benefits and utility of the family plan 20 via the API 19 and the family plan widgets 118 that run on the member mobile devices 31. Non-family plan members cannot make use of the benefits and utility of the family plan 20. The family-plan management system 8 enables family plan members to obtain family plan services using graphical interface icons, including desktop home screen family plan widget 118 icons, thus saving valuable graphical user interface space and enabling fast and easy delivery of family plan 20 services.

FIG. 2 illustrates an abstract hierarchical functional operation of a mobile device 31 from basic hardware devices to the top level family plan widget 118. At the lowest abstraction level is a collection of basic semiconductor hardware 202 devices, typically integrated circuits. Such semiconductor hardware 202 typically includes memory 204, a central processor unit ("CPU") 206, numerous sensors and their support electronics 208, input/output ("I/O") 210 device support (specifically including display screens and drivers, audio drivers and outputs, RF transceivers, etc.), and glue devices 212 as required to change voltage levels or signal levels and to perform other interfacing as required for proper hardware 202 functionally. The desktop home screen should be understood as being part of the input/output 210.

Still referring to FIG. 2, the next level of abstract hierarchical progression is firmware 220, if required. Firmware 220 is useful for enabling upgrading of the mobile device 31 by storing in non-volatile memory settings, such as model numbers, version numbers, and controlling bits which establish a set of functions and limit or restrict the mobile device's capabilities.

Moving up the abstract hierarchical progression from the firmware 220 is an operating system 224. The operating system 224 provides a set of core software programs that manage the semiconductor hardware 202 and firmware 220 and implement common services for application software. The operating system 224 includes a low-level "kernel" routine 226 that handles basic software integration to the firmware 220 and hardware 202 to implement underlying functions. In practice the kernel 226 is used across a family of mobile devices. Over the kernel 226 is a set of core services 230 that while still basic may change from time to time or from family device to family device. The core services 230 are software functions that support the on-board services of the mobile device 31. In the mobile device 31 the core services include software routines that support and enable obtaining location information 302 (such as from a GPS routine). Overlaying the operating system 224 is the family plan widget 118.

Referring now again to FIG. 1, as previously noted the central server 10 includes the API 19. The API 19 is part of the operating software 17 of the central server 10. The operating software 17 controls the operations of the central server 10, the API 19 implements the carrier based functions of the family-plan management system 8 while the family plan widget 118 implements the mobile device 31 functions of the family plan management system 8.

The family plan management system 8 depends on the existence of a family plan 20. With a family plan 20 established and in use the central server 10 can automatically build and improve family plan services over the carrier network without needing to authorize and individually identify family plan members that are eligible for the new or improved services.

To create a family plan 20 a user first indicates an interest in a family plan to the carrier, typically by visiting a mobile device store, a web site or by obtaining and installing a special mobile phone app. If a mobile phone app is being used, the central server 10 automatically obtains the user mobile device (phone) number. Otherwise the user is asked to input their mobile device number. The user mobile device number is then authenticated by the central server 10 by having the server 12 interrogate its database 16. The authenticated user mobile device number is then used as the family plan 20 identification. One or more messages and/or SMS verification codes are sent by the central server 10 to the user mobile device number. The user then sends the verification code back to the central server 10, thus establishing proper credentials to implement a family plan 20.

The central server 10 then obtains either from its database 16, another accessible database, or from the parent the identifications of the members to be added to the user's family plan 20. If the user is a parent for example, members added may include the parent's children. The identification includes the mobile device numbers of the family plan members. The user then verifies which members should be in the family plan 20. Once members are selected, the central server 10 automatically creates the family plan 20 and retains the family plan members in the database 16 as being part of the family plan 20. Depending on the particularities of the family plan 20 each member may have to authorize being added to the family plan 20. For example, each member mobile device 31 can be sent a notification and provide consent responsive thereto to be activated by the central server 10.

Figure 3:
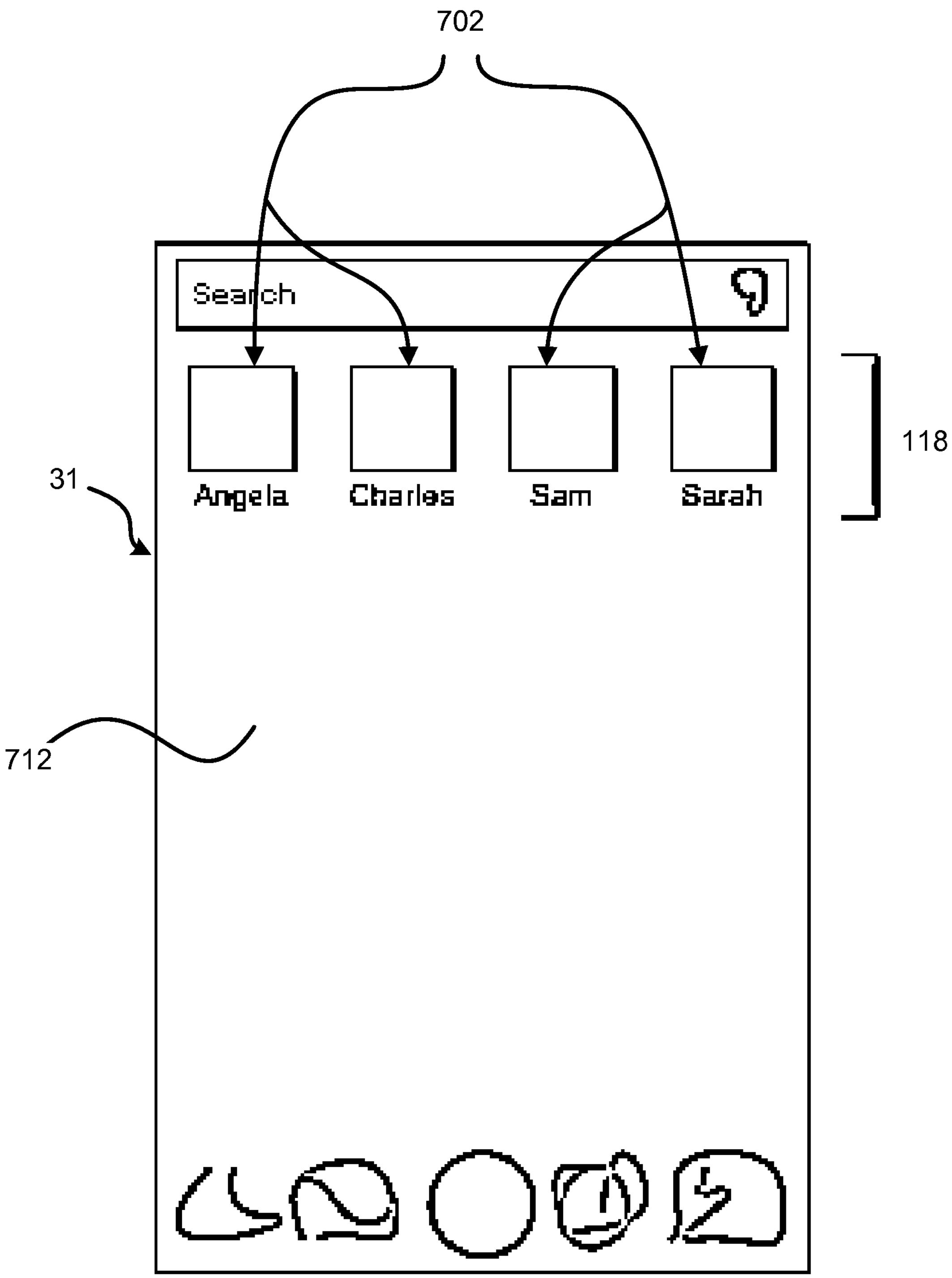
FIG. 3 is a prototypical example of a family plan top level desktop display screen graphic user interface ("GUI")

With the family plan 20 implemented and its members authenticated and added to the database 16, the central server 10 initiates operation of the family plan management system 8. The family plan management system 8 integrates the operations of family plan widgets 118 and the API 19 to provide family plan services. For example, the family plan management system 8 enables a user (e.g. parent) via his family plan widget 118 to be able to locate any member (e.g. child) mobile device 31 by interrogating the central server 10 using the API 19. FIG. 3 illustrates a prototypical screenshot of a mobile device 31 displaying a family plan widget 118 having 4 members. The family plan widget displays graphical user interface icons 702 for selected family plan members. There may be more family plan members than displayed graphical user interface icons. The graphical user interface icons enable quick and efficient family plan service functions.

The family plan widget 118 enables a range of family plan services using graphical user interfaces. Some of those family plan services may require the availability of one or more supporting applications. The family plan widget 118 beneficially detects if a required supporting application is installed on a mobile device 31. If a required supporting application is not installed, the family plan widget 118 provides the parent user with an opportunity to obtain the required supporting application. Preferably this is performed by tapping a corresponding "purchase" action in a widget that provides the parent the opportunity to purchase the required supporting application.

As an example, if a family plan widget 118 is installed on a child user's mobile device 31, the family plan widget 118 may include a "locate" action that requires a missing GPS supporting application. When the child user initiates the locate action the parent user is provided with an opportunity to purchase the GPS supporting application. Alternatively, if the family plan management system 8 allows for child purchases of missing supporting applications the child will be provided with the opportunity to obtain the GPS supporting application instead of the parent.

In addition, not all family plan management systems 8 may include all available family plan services. For example, a carrier may provide family plan management systems 8 using a menu of services, each of which costs money. Some family plan management systems 8 may chose not to include location finding. However, the family plan widget 118 may provide the opportunity to find the location of a user. A user who attempts to locate another user may be provided with the opportunity to add location finding. Alternatively, depending on the configuration of the family plan 8, the parent user may be provided with the opportunity to upgrade services.

Figure 4A:
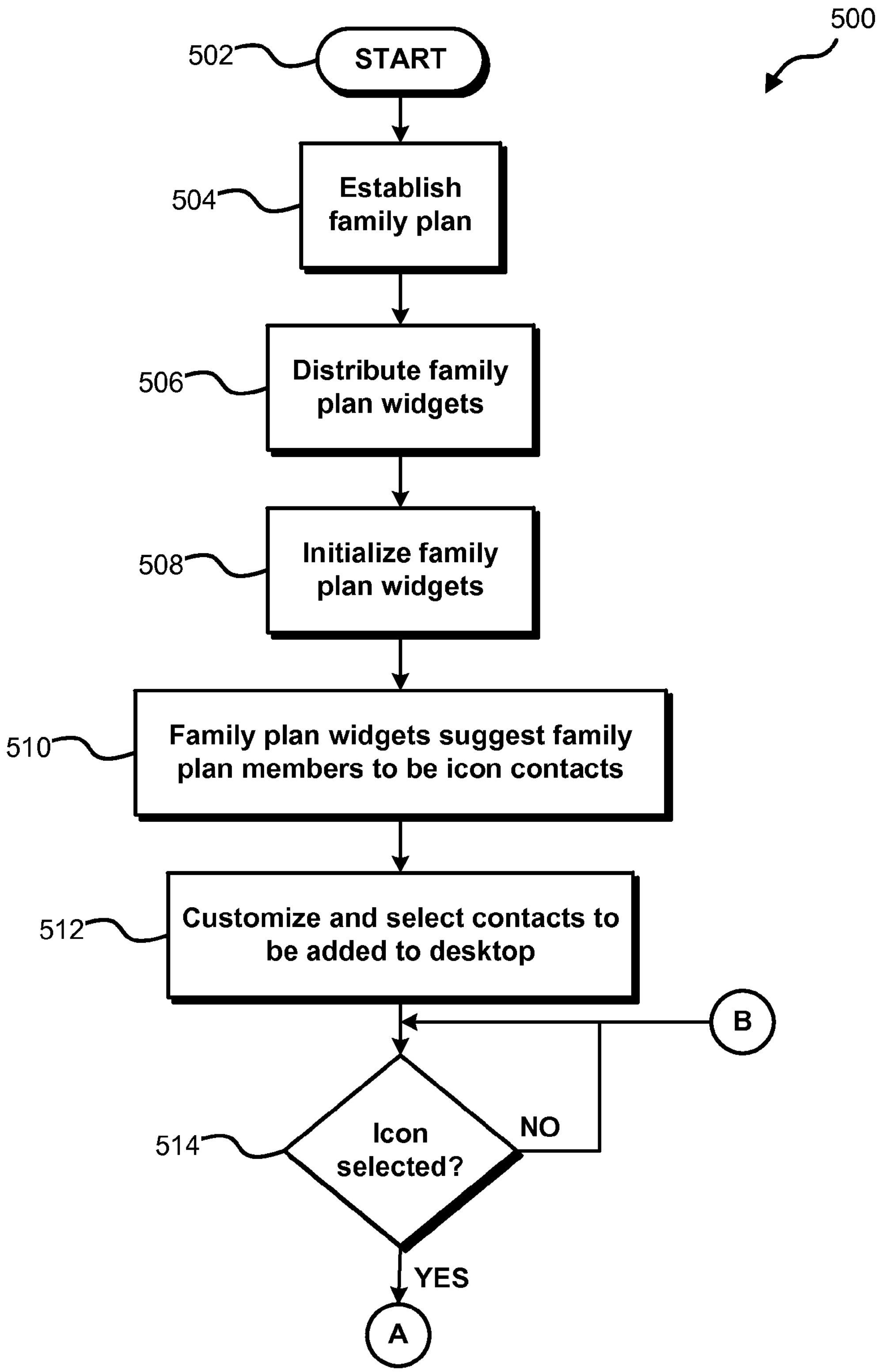
FIG. 4A is a flow chart showing an operation of a family plan management system.
Figure 4B:
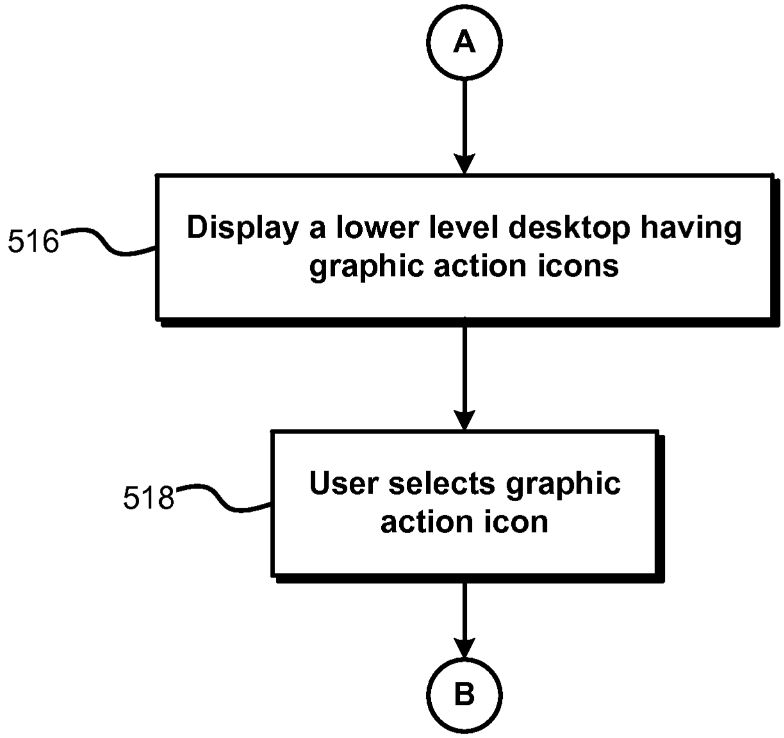
FIG. 4B is a flow chart showing an operation of a family plan management system.

Turning now to FIGS. 4A and 4B, the family plan management system 8 operates in accord with operation 500. Operation 500 starts, step 502, and proceeds by establishing a family plan 20, step 504, as described above. Family plan widgets 118 are distributed to the family plan members, step 506 and reference FIG. 3. This is performed by the server 12 operating in accord with the API 19 to send family plan widgets 118 to one or more members of the family plan 20.

After the family plan widgets 118 are distributed, each family plan widget 118 is initialized, step 508. At initialization a family plan member installs its received family plan widget 118 and the member's mobile device 31 contacts the central server 10. The central server 10 obtains the member's mobile device (phone) number and the server 12 searches the database 16, identifies all family plan members in the family plan 20 of the installing member, and sends that identification information to the member's mobile device 31. Thus each member is supplied with information as to who is in his/her family plan 20.

The operation 500 proceeds by having the installing family plan widget 118 implement a suggested set of graphic icons 702 (reference FIG. 3) on the desktop home screen 712 to be icon contacts, step 510. It should be understood that there may well be more family plan members than can be reasonably given icons on the desktop home screen 712. To address that issue the operation 500 proceeds by having the user of a mobile device 31 customize their mobile device 31 by either accepting the selected set of graphic icons or by selecting other family plan members to be given graphic icons on the desktop home screen, step 512. That selection enables a family plan member to tailor their desktop home screen 712 to suit their needs and available desktop home screen space.

Figure 5:
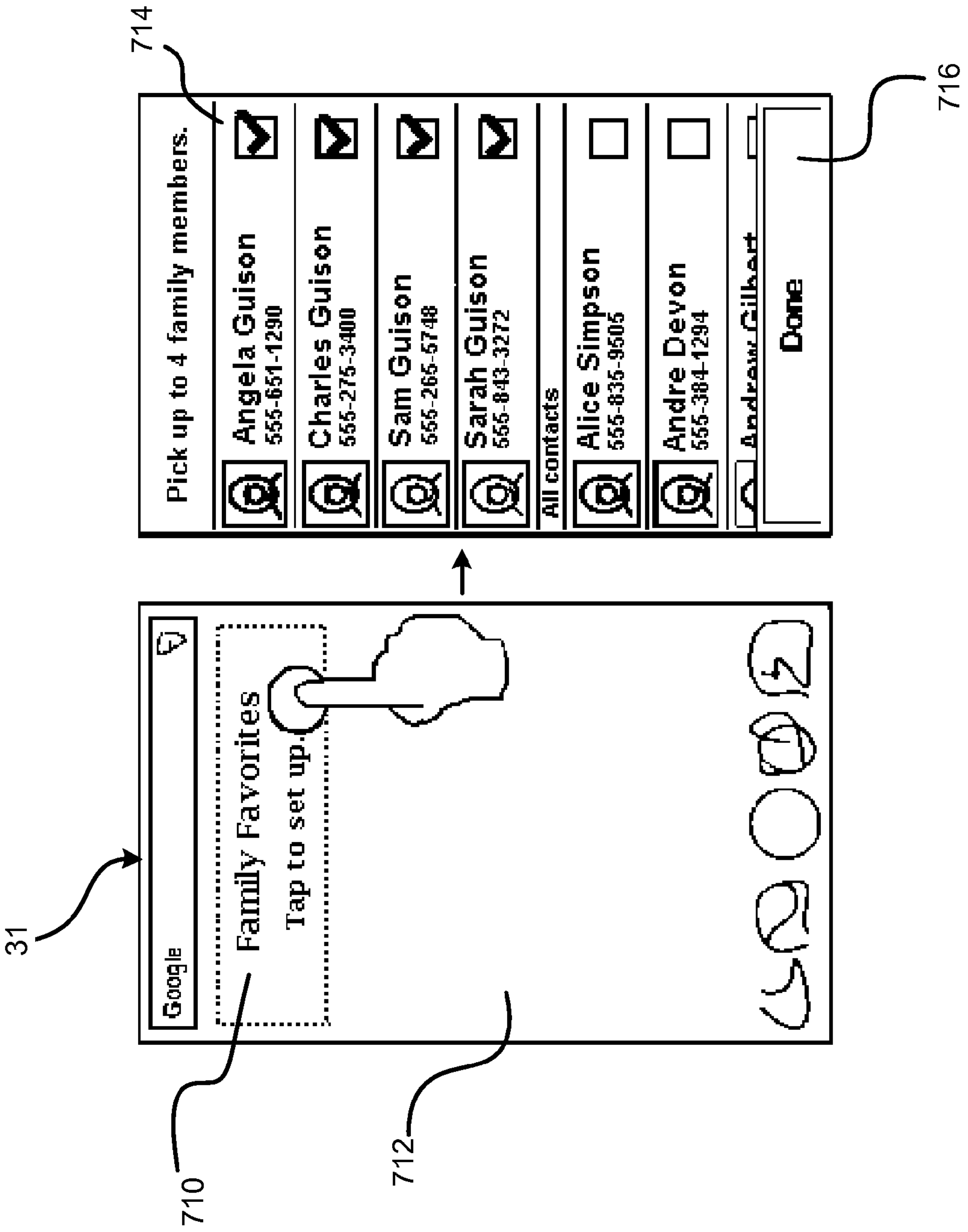
FIG. 5 shows prototypical examples of desktop displays during set-up of a family plan widget.

FIG. 5 illustrates screen shots of the family plan widget 118 during step 512. The family plan widget 118 is operationally switched (either automatically by a user action) to display a "set up" screen 710 in the desktop home screen 712. When the set up screen 710 is selected (in FIG. 5 by tapping) the mobile device 31 display is changed to a lower lever set-up screen 714 that displays a listing and corresponding graphic icons of all members of the family plan 20. The user can then select (by tapping) up to 4 family plan members to be assigned representative graphic icons 702 on the desktop home screen 712. The limit of 4 family plan members is not a requirement and different implementations and different devices may have more or less. Once the user has selected the family plan members to be given graphic icons 702, the user taps a "Done" box 716 and the mobile device 31 reverts to displaying its desktop home screen 712 with graphic icons 702 representative of the selected family plan members.

Following step 512, the family plan widget 118 determines if a graphic icon 702 representing a family plan member or another contact has been selected (such as by tapping), step 514. If not, the operation 500 returns to step 514 and waits for a user to select a graphic icon 702. After a user selects a graphic icon 702 of a family plan member, the family plan widget 118 causes the mobile device's 31 desktop home screen 712 to switch to a lower level display showing a set of graphic action icons that represent supported family plan services such as calling the selected family plan member, sending the selected member SMS text messages, locating the selected family plan member, or another family plan-specific service associated with the selected member, step 516.

FIG. 6 presents prototypical screen shots suitable for illustrating step 516. A desktop home screen 730 shows an alternative view of the desktop home screen 712 shown in FIG. 3. The major difference being that the orientation of the desktop home screen 730 extends along the wide screen direction of the mobile device 31 while the desktop home screen 712 extends along the narrow screen direction of the mobile device 31. The desktop home screen 740 shows a set of graphic action icons 760 that appear when one of the graphic icons 702 of a family plan member is selected (such as by tapping). Upon receiving a selection, the family plan widget 118 causes the mobile device 31 to present graphic action icons 760 that are supported by the family plan 20. For example in FIG. 6 the family plan 20 supports calling, texting, locating, and mobile device locking with respect to the mobile device 31 of the selected member.

Returning now to operation 500 (FIG. 4B), with the desktop screen 740 displayed the user selects a graphic action icon 760 to automatically perform a supported service, step 518. FIG. 7 presents screen shots that assist understanding step 518. The far left screen 800 illustrates a user 802 selecting a graphic icon 804 for a family plan member "Charles". In response to selecting the "Charles" graphic icon 804, the family plan widget 118 presents a lower level desktop screen 810 showing graphic action icons 760 of family plan supported services such as electronic texting, represented by graphic action icon 820. The user 802 then selects the graphic action icon 820. In response the family plan widget 118 brings up a "Text" screen 850 that automatically includes information for "Charles," such as his name, phone number, and information that automatically identifies him as the message recipient.

After step 518 is completed, the family plan widget 118 returns to step 514 to await the selection of another family plan member icon 702. The operation 500 has no stop as it is meant to continue operating indefinitely until some external action forces a stop or reset.

The foregoing has described the family plan management system 8 mostly with reference to the operation of the family plan widgets 118. In practice a family plan widget 118 may simply call forth a locally resident application such as texting to fulfill the required operation. Similarly, the locate action could be fulfilled by calling forth a local application that is resident on the user's phone. In such cases the family plan widget 118 acts as a convenient user interface to a range of locally available services. However, the family plan management system 8 may rely on the API 19 to implement central server 10 based functions. This flexibility enables the family plan management system to use both locally available and remotely available services. FIG. 8 shows operational details of step 518 when it is using functions primarily provided by the API 19.

Referring to FIG. 8, step 518 starts, step 600, and proceeds with the API 19 sending what is referred to herein as a push notification to the family plan widgets 118 and mobile devices 31. A push notification informs family plan widgets 118 of incoming API 19 generated signals, such as notifications of new family plan members or new or improved services, step 602. The API 19 pushes family plan member notifications of family plan changes to family plan members. Accessing the database 16 to identify family plan members should be understood as being part of the operation 602.

In addition to pushing notifications to family plan members the API 19 can pull information, either automatically or when requested by a family plan member, from family plan members, step 604. An example of pulling information would be a family plan member using a family plan widget 118 to find the location of one or more family plan members. For example, in FIG. 6 the graphic action icons include a "Locate" action icon 902. To find the locations of family plan member a user selects the action icon 902. In response the family plan widget 118 sends a message to the central server 10 to locate selected family plan member. The API 19 then interrogates the central server 10 network to locate the selected family plan member, for example, by finding the closest tower to the family plan member(s), by interrogating the location sensors on the mobile devices 31, by a triangulation between central server 10 towers, or other suitable method of locating a mobile device.

The example of locating family plan members is instructive as it postulates various possibilities of operation. In one implementation, only a parent would be authorized to use the API 19 to locate a family member. In another implementation location information of a particular family plan member can be sent to a user automatically without a request from the user. In another implementation, a user is enabled to locate a family plan member only at designated times.

Use of API 19 is not limited to location finding or notification sending. The API 19 enables users (e.g. parents) to actively control member devices (e.g. their children's devices), step 606. For example, by using the API 19 parents can control child mobile devices 31, step 606. Referring to FIGS. 6 and 7, a parent user 802 selecting a graphic user icon 804 for a family plan child member can lock predetermined functions of that child member's phone by pressing the Lock icon 823. Further, a parent can use the API 19 to restrict the child member's device usage, either automatically such as when the API 19 detects motion of a child mobile device (auto-lock), or when a parent initiates scheduled or on-demand restrictions (timed-lock).

The API 19 can be used to implement other features. For example, a parent can be provided with real-time and aggregated information on the usage of a child's mobile device 31. Such information can be kept by the API 19 and stored in the database 16 as required for future access.

The family plan management system 8 has been described as having a rather limited number of available options, such as communications and location finding. However, it should be clearly understood that those represent only a small fraction of possible family plan management system 8 services and options. The goal is to have an extendable family plan management system 8 that is highly flexible and adaptable over time by either adding or removing options.

Family plan widgets 118 support both "Portrait" as in FIG. 5 and "Landscape" as in FIG. 6 representations of family plan graphic icons as well as intelligent icon placement to reduce the impact of the family plan widget 118 on the desktop home screen. As an example, the family plan widget 118 can be placed anywhere on the desktop home screen of the mobile device 31 where at least 4 consecutive horizontal screen tiles are available. If the family plan widget 118 is placed at the bottom of the device-screen, the family member icons appear above a row of family member asset icons.

Methods described herein may be implemented in a computer program, software, or firmware incorporated in a computer-readable medium for execution by a computer or processor. Although features and elements are described above in particular combinations, one of ordinary skill in the art will appreciate that each feature or element can be used alone or in any combination with the other features and elements. Further, while embodiments have been described in detail above, these embodiments are non-limiting and should be considered as merely exemplary. Modifications and extensions may be developed, and all such modifications are deemed to be within the scope defined by the appended claims.

What is claimed is:

1. A computer implemented method comprising:

generating within a graphical user interface a contact representation corresponding to a particular contact representing a member of a co-member plan:

generating within the graphical user interface a communication action representation, a location action representation, and a control action representation corresponding to the particular contact responsive to a user actuation of the contact representation, wherein each of the communication action representation, the location action representation, and the control action representation represents a service supported by an application program interface (API) enabled by a telecommunication system that identifies members of the co-member plan; and transmitting instructions for controlling a mobile device corresponding to the particular contact responsive to a user actuation of the control action representation.

2. The computer implemented method of claim 1, further comprising transmitting instructions for locating the mobile device corresponding to the particular contact responsive to a user actuation of the location action representation.

3. The computer implemented method of claim 1, further comprising receiving location information corresponding to the particular contact and providing an indication of the location of the particular contact via the graphical user interface responsive to a user actuation of the location action representation.

4. The computer implemented method of claim 1, wherein the contact representation comprises at least one of a picture of the particular contact and a name of the particular contact.

5. The computer implemented method of claim 1, wherein the instructions for controlling the mobile device comprise instructions to restrict access to at least one functional component of the mobile device.

6. The computer implemented method of claim 1, wherein the instructions for controlling the mobile device comprise instructions to restrict use of at least one of telephone calling functionality and electronic messaging functionality.

7. The computer implemented method of claim 1, further comprising receiving at least one of location information and use information corresponding to the mobile device and providing a notification corresponding to the at least one of the location information and the use information in proximity to the contact representation.

8. The computer implemented method of claim 1, further comprising receiving at least one of location information and use information corresponding to the mobile device and providing a notification corresponding to the at least one of the location information and the use information within a status bar of the graphical user interface.

9. The computer implemented method of claim 1, further comprising:

generating within the graphical user interface a plurality of contact representations respectively corresponding to a plurality of contacts;

generating within the graphical user interface a communication action representation, a location action representation, and a control action representation corresponding to a particular one of the plurality of contacts responsive to a user actuation of the contact representation; and transmitting instructions for controlling a mobile device corresponding to the particular contact responsive to a user actuation of the control action representation.

10. The computer implemented method of claim 1, further comprising:

providing the graphical user interface on a mobile device corresponding to a user, the mobile device configured for network communication with the telecommunication system; and transmitting the instructions for controlling the mobile device corresponding to the particular contact via the telecommunication system responsive to actuation of the control action representation by the user, wherein the user and the contact are members of a co-member plan enabled by the telecommunication system.

11. The computer implemented method of claim 1, wherein at least one of the contact representation, the communication action representation, the location action representation, and the control action representation. comprises a display icon.

12. A method of operating a co-member plan, comprising:

implementing an application program interface (API) enabled by a telecommunication system that identifies members of a co-member plan;

implementing a widget on a mobile device associated with a member of the co-member plan, wherein the widget enables a plurality of graphical user icons, and wherein each graphical user icon represents a member of the co-member plan;

enabling a plurality of action icons directed to a member of the co-member plan when a user selects a graphical user icon representing the member, and wherein each action icon graphically represents a service supported by the API; and perforating a service associated with the member when the user selects an action icon associated with the user.

13. The method of operating a co-member plan according to claim 12, wherein the performed service is at least partially implemented by the API.

14. The method of operating a co-member plan according to claim 12, wherein the performed service is at least partially implemented using a locally resident supporting application.

15. The method of operating a co-member plan according to claim 14, further including the step of providing an opportunity to download a required supporting application.

16. The method of operating a co-member plan according to claim 12, further including the step of providing an opportunity to authorize the service.

17. The method of operating a co-member plan according to claim 12, wherein at least one of the action icons initiates a service establishing communications between the member and the user.

18. The method of operating a co-member plan according to claim 12, wherein at least one of the action icons initiates locating the member geographically.

19. The method of operating a co-member plan according to claim 12, wherein at least one of the action icons initiates a service establishing text communication between the member and the user.

20. The method of operating a co-member plan according to claim 12, wherein at least one of the action icons initiates a service locking at least one function of the mobile device of the member.

21. The method of operating a co-member plan according to claim 13, wherein at least one of the action icons directs the API to add a new co-member plan member.

22. The method of operating a co-member plan according to claim 21, wherein the API informs the co-member plan member that a new member has been added.

23. The method of operating a co-member plan according to claim 13, further comprising using the API to add a new service.

24. A processor-implemented system, comprising:

a server comprising communication capability and a database, the server configured to enable an API for establishing a co-member plan comprising a plurality of services and a plurality of members, each member associated with a mobile device, wherein the API identifies members of the co-member plan using data in the database and using mobile device telephone numbers;

a mobile device in communication with the server enabled to operate a widget which implements a plurality of graphical user icons, wherein each graphical user icon represents a member of the co-member plan;

wherein selection by a user of the graphical user icon on the e mobile device causes the widget to enable a plurality of action icons directed to the member;

wherein each action icon represents a service supported by the API; and wherein the system performs a service associated with the member when the user selects an action icon.

25. The processor-implemented system according to claim 24, wherein at least one of the action icons initiates establishing communications between the member and the user.

26. The processor-implemented system according to claim 24, wherein at least one of the action icons initiates locating one of the plurality of members.

27. The computer implemented method of claim 1, further comprising transmitting the instructions for controlling the mobile device via the API enabled by the telecommunication system, 28. A co-member plan operating method comprising:

implementing a widget on a mobile device associated with a member of a co-member plan, wherein the widget enables a plurality of graphical user icons, and wherein each graphical user icon represents a member of the co-member plan;

enabling a plurality of action icons directed to a member of the co-member plan when a user selects a. graphical user icon representing the member, and wherein each action icon graphically represents a service supported by an application program interface (API) enabled by a telecommunication system that identifies members of the co-member plan; and performing a service supported by the API associated with the member when the user selects an action icon associated with the user.

29. The co-member plan operating method of claim 28, wherein the performed service is at least partially implemented using a locally resident supporting application on the mobile device.

* * * * *

UNITED STATES PATENT AND TRADEMARK OFFICE

CERTIFICATE OF CORRECTION

PATENT NO. : 9,047,651 B2
APPLICATION NO. : 13/620397
DATED : June 2, 2015
INVENTOR(S) : Roumeliotis et al.

It is certified that error appears in the above-identified patent and that said Letters Patent is hereby corrected as shown below:

IN THE CLAIMS

In claim 12, at column 10, line 66, delete “perforating” and insert therefore --performing--.

Signed and Sealed this
Twenty-first Day of June, 2016

Michelle K. Lee

Michelle K. Lee
*Director of the United States Patent and Trademark Office*